(12) United States Patent
Miyamoto et al.

(10) Patent No.: US 9,296,660 B2
(45) Date of Patent: *Mar. 29, 2016

(54) CERAMIC CARBON COMPOSITE MATERIAL, METHOD FOR PRODUCING CERAMIC CARBON COMPOSITE MATERIAL, CERAMIC-COATED CERAMIC CARBON COMPOSITE MATERIAL, AND METHOD FOR PRODUCING CERAMIC-COATED CERAMIC CARBON COMPOSITE MATERIAL

(75) Inventors: Yoshinari Miyamoto, Osaka (JP); Weiwu Chen, Osaka (JP); Masaharu Nakamura, Osaka (JP); Taihei Matsumoto, Osaka (JP); Tetsuro Tojo, Osaka (JP)

(73) Assignee: Toyo Tanso Co., Ltd., Osaka (JP)

( * ) Notice: Subject to any disclaimer, the term of this patent is extended or adjusted under 35 U.S.C. 154(b) by 1068 days.

This patent is subject to a terminal disclaimer.

(21) Appl. No.: 13/392,594

(22) PCT Filed: Sep. 1, 2010

(86) PCT No.: PCT/JP2010/064872
§ 371 (c)(1),
(2), (4) Date: Feb. 27, 2012

(87) PCT Pub. No.: WO2011/027757
PCT Pub. Date: Mar. 10, 2011

(65) Prior Publication Data
US 2012/0164441 A1    Jun. 28, 2012

(30) Foreign Application Priority Data
Sep. 4, 2009   (JP) ................................. 2009-205042

(51) Int. Cl.
*B32B 5/22*    (2006.01)
*B05D 3/06*    (2006.01)
(Continued)

(52) U.S. Cl.
CPC ......... *C04B 35/522* (2013.01); *C04B 35/62805* (2013.01); *C04B 35/62807* (2013.01);
(Continued)

(58) Field of Classification Search
USPC ......... 428/408, 409, 688, 689, 697, 698, 701, 428/702, 704, 304.4, 312.2, 323, 402, 634; 427/215, 212; 264/673, 682, 681, 683, 264/434; 501/95.2, 97.4, 98.3, 98.6
See application file for complete search history.

(56) References Cited

U.S. PATENT DOCUMENTS

| 4,298,391 A | 11/1981 | Hayase et al. |
| 5,246,897 A * | 9/1993 | Ono et al. ..................... 501/101 |

(Continued)

FOREIGN PATENT DOCUMENTS

| DE | 42 26 211 A1 | 2/1993 |
| JP | 58-181713 A | 10/1983 |

(Continued)

OTHER PUBLICATIONS

Preparation and Characterization of Al2O3 Coated Graphite Powders, Key Engineering Materials vols. 280-283(2005) p. 1671-1674.*

(Continued)

*Primary Examiner* — Lauren Colgan
(74) *Attorney, Agent, or Firm* — Keating & Bennett, LLP (57) ABSTRACT

Achieved is a ceramic carbon composite material and a ceramic-coated ceramic carbon composite material which are lighter than ceramics and excellent in at least one of properties including oxidation resistance, resistance to dust generation, heat conductivity, electrical conductivity, strength, and denseness. The ceramic carbon composite material is a ceramic carbon composite material in which an interfacial layer of a ceramic is formed between carbon particles of or containing graphite. The ceramic carbon composite material can be produced by forming a green body from ceramic-coated powder in which the surfaces of carbon particles of or containing graphite are coated with individual ceramic layers and sintering the green body.

11 Claims, 3 Drawing Sheets

(51) Int. Cl.
*C04B 35/52* (2006.01)
*C04B 35/628* (2006.01)
*C04B 35/63* (2006.01)
*C04B 35/645* (2006.01)
*C04B 37/00* (2006.01)

(52) U.S. Cl.
CPC ..... *C04B35/62813* (2013.01); *C04B 35/62821* (2013.01); *C04B 35/62831* (2013.01); *C04B 35/62834* (2013.01); *C04B 35/62836* (2013.01); *C04B 35/62897* (2013.01); *C04B 35/6303* (2013.01); *C04B 35/645* (2013.01); *C04B 37/001* (2013.01); *C04B 2235/425* (2013.01); *C04B 2235/5436* (2013.01); *C04B 2235/9615* (2013.01); *C04B 2237/34* (2013.01); *C04B 2237/341* (2013.01); *C04B 2237/343* (2013.01); *C04B 2237/348* (2013.01); *C04B 2237/36* (2013.01); *C04B 2237/363* (2013.01); *C04B 2237/365* (2013.01); *C04B 2237/368* (2013.01); *Y10T 428/249921* (2015.04); *Y10T 428/265* (2015.01)

(56) References Cited

U.S. PATENT DOCUMENTS

| | | | |
|---|---|---|---|
| 5,374,342 A | 12/1994 | Sekhar | |
| 5,486,496 A * | 1/1996 | Talbert et al. | 501/90 |
| 5,707,567 A * | 1/1998 | Pfaff | 264/29.7 |
| 5,976,429 A * | 11/1999 | Chen et al. | 264/29.6 |
| 6,030,913 A * | 2/2000 | Heine et al. | 501/88 |
| 6,248,269 B1 * | 6/2001 | Dietrich et al. | 264/29.1 |
| 6,716,528 B1 | 4/2004 | Matsumoto et al. | |
| 6,953,760 B2 * | 10/2005 | Pujari et al. | 501/90 |
| 7,842,432 B2 * | 11/2010 | Niu et al. | 429/512 |
| 2002/0109250 A1 * | 8/2002 | Kim et al. | 264/29.7 |
| 2003/0195122 A1 * | 10/2003 | Demendi et al. | 508/107 |
| 2005/0181209 A1 * | 8/2005 | Karandikar | 428/408 |
| 2005/0276961 A1 * | 12/2005 | Sherwood et al. | 428/292.1 |
| 2006/0062985 A1 * | 3/2006 | Karandikar | 428/292.1 |
| 2009/0149309 A1 * | 6/2009 | Akasaka et al. | 501/90 |
| 2009/0313907 A1 | 12/2009 | Can et al. | |
| 2012/0156479 A1 * | 6/2012 | Nakamura et al. | 428/336 |

FOREIGN PATENT DOCUMENTS

| | | | |
|---|---|---|---|
| JP | 59-129142 A | | 7/1984 |
| JP | 60-25569 A | | 2/1985 |
| JP | 3-174358 A | | 7/1991 |
| JP | 05-194044 A | | 8/1993 |
| JP | 08-119741 A | | 5/1996 |
| JP | 10-279367 | * | 10/1998 |
| JP | 11-310474 | * | 11/1999 |
| JP | 11-310474 A | | 11/1999 |
| JP | 2000-088111 A | | 3/2000 |
| JP | 2001-180919 A | | 7/2001 |
| JP | 2004-339048 A | | 12/2004 |
| WO | 2007/144733 A2 | | 12/2007 |

OTHER PUBLICATIONS

Official Communication issued in International Patent Application No. PCT/JP2010/064872, mailed on Nov. 2, 2010.

Official Communication issued in corresponding European Patent Application No. 10813706.8, mailed on Feb. 12, 2013.

Yu et al., "Improvement in Flowability, Oxidation Resistance and Water Wettability of Graphite Powders by TiO2 Coating," Journal of the Ceramic Society of Japan, vol. 106, No. 6, 1996, pp. 481-485.

Mukhopadhyay et al., "Spinel-Coated Graphite for Carbon Containing Refractory Castables," J. Am. Ceram. Soc. vol. 92, No. 8, Aug. 1, 2009, pp. 1895-1900.

Wei et al., "Preparation and Characterization of Al2O3 Coating Graphite Powders," Journal of the Chinese Ceramic Society, vol. 32, No. 8, Aug. 2004, pp. 916-919.

Official Communication issued in corresponding Chinese Patent Application No. 201080039131.0, mailed on Apr. 3, 2013.

English translation of Official Communication issued in corresponding International Application PCT/JP2010/064872, mailed on Apr. 19, 2012.

Official Communication issued in corresponding Russian Patent Application No. 2012112955, mailed on Apr. 8, 2014.

* cited by examiner

CERAMIC CARBON COMPOSITE MATERIAL, METHOD FOR PRODUCING CERAMIC CARBON COMPOSITE MATERIAL, CERAMIC-COATED CERAMIC CARBON COMPOSITE MATERIAL, AND METHOD FOR PRODUCING CERAMIC-COATED CERAMIC CARBON COMPOSITE MATERIAL

TECHNICAL FIELD

This invention relates to ceramic carbon composite materials that are composite materials of graphite and ceramic, methods for producing the ceramic carbon composite materials, ceramic-coated ceramic carbon composite materials, and methods for producing the ceramic-coated ceramic carbon composite materials.

BACKGROUND ART

Carbon materials have low specific gravity and excellent heat resistance, corrosion resistance, slidability, electrical conductivity, heat conductivity, and workability, and are therefore conventionally used in a wide variety of fields including semiconductor technology, metallurgy, mechanical technology, electrotechnology, and nuclear technology.

However, carbon materials generally have a problem in that they are poor in oxidation resistance and strength. To solve this problem, it has been considered to combine a carbon material and another material, such as ceramics, into a composite.

Examples of the combination of a carbon material and a ceramic material into a composite include SiC-coated graphite composite materials in which a graphite base material is coated with SiC or TaC by a vapor phase reaction or a melt reaction, and the SiC-coated graphite composite materials are utilized as susceptors for producing compound semiconductors by chemical vapor deposition. Although these products have heat resistance and chemical stability and prevent dust generation from graphite particles, they do not provide increased strength and their production cost is high. Therefore, the products are limited to some applications, such as a susceptor. In addition, it is technically difficult to provide uniform coating on graphite base materials having three-dimensionally complex shapes.

Meanwhile, an SiC/carbon composite material has been developed in which porous carbon is impregnated with molten silicon at a high temperature to induce a combustion synthesis reaction and the insides of pores in the porous carbon are thereby converted to SiC (see Patent Literature 1). For this composite material, a near-net-shape product can be formed based on a porous carbon material processed in a relatively simple three-dimensional shape, such as a bolt or a nut. However, this composite material has a lack of denseness and a rough surface which are characteristic of impregnation materials and also has a high cost. Therefore, the composite material is not used much in the present circumstances.

Furthermore, there has recently been developed a sintered C—SiC composite obtained by mixing ultrafine SiC powder having an average particle diameter of 10 to 100 nm and graphite particles and densifying the mixture to have a high density by spark plasma sintering (see Patent Literature 2). This composite material is reported to contain 1% to 95% by weight of SiC, have a relative density of 70% to 99.5%, and have a bending strength as high as 100 to 350 MPa. However, this composite material has a composite structure in which SiC particles and carbon particles are uniformly mixed, and does not rely on the concept that a composite material is formed to separate the interfaces between carbon particles through a ceramic. In addition, the type of ceramic used is limited to SiC.

Of carbon composite materials, C/C composites obtained by impregnating carbon fiber fabric with pitch and firing it and composite materials impregnated with resin are widely used. Although these composite materials have excellent strength, they do not achieve improved oxidation resistance and, therefore, the use of them in air at high temperatures is limited. In addition, these materials have rough surface, are difficult to process, and take a long time to be produced.

CITATION LIST

Patent Literature

Patent Literature 1: JP-A-S60-25569
Patent Literature 2: JP-A-2004-339048

SUMMARY OF INVENTION

Technical Problem

An object of the present invention is to provide a ceramic carbon composite material lighter than ceramics and excellent in at least one of properties including oxidation resistance, resistance to dust generation, heat conductivity, electrical conductivity, strength, and denseness, a method for producing the ceramic carbon composite material, a ceramic-coated ceramic carbon composite material, and a method for producing the ceramic-coated ceramic carbon composite material.

Solution to Problem

In a ceramic carbon composite material according to the present invention, an interfacial layer of a ceramic is formed between carbon particles of or containing graphite.

Since the ceramic carbon composite material according to the present invention is a composite material composed of carbon particles of or containing graphite and a ceramic, it is lighter than ceramic materials. Furthermore, since the ceramic carbon composite material has an interfacial layer of a ceramic formed to coat the surfaces of the carbon particles of or containing graphite, the ceramic carbon composite material is more excellent in at least one of properties including oxidation resistance, resistance to dust generation, heat conductivity, electrical conductivity, strength, and denseness than composite materials in which carbon and a ceramic are simply mixed.

In the present invention, the interfacial layer of the ceramic preferably has a continuous three-dimensional network between the carbon particles of or containing graphite. Since the interfacial layer of the ceramic has a continuous three-dimensional network, the ceramic carbon composite material can exhibit more excellent performance in terms of oxidation resistance, resistance to dust generation, heat conductivity, electrical conductivity, strength, and/or denseness.

In the present invention, the interfacial layer of the ceramic can be formed of, for example, at least one selected from the group consisting of AlN, $Al_2O_3$, SiC, $Si_3N_4$, $B_4C$, TaC, NbC, ZrC, ZnO, $SiO_2$, and $ZrO_2$.

The thickness of the interfacial layer of the ceramic in the present invention can be 100 nm to 10 µm, for example.

A method for producing a ceramic carbon composite material according to the present invention is a method that can produce the above ceramic carbon composite material according to the present invention, and the method includes the steps of: preparing ceramic-coated powder in which the surfaces of carbon particles of or containing graphite are coated with individual ceramic layers made of the ceramic; and forming a green body from the ceramic-coated powder and sintering the green body to produce the ceramic carbon composite material.

When a green body made of ceramic-coated powder is sintered, ceramic coatings on the surfaces of the ceramic-coated powder particles are sintered together to form an interfacial layer of the ceramic in a ceramic carbon composite material.

With the production method according to the present invention, the above ceramic carbon composite material according to the present invention can be efficiently produced.

Examples of a method for forming the ceramic layers on the surfaces of the carbon particles include gas phase methods, liquid phase methods, mechanically mixing methods, and combined methods thereof.

An alternative method for forming the ceramic-coated powder is a method in which the ceramic layers are formed by adding the carbon particles into a slurry of ceramic particles to allow the ceramic particles to adhere to the surfaces of the carbon particles.

In a ceramic-coated ceramic carbon composite material according to the present invention, a ceramic coating layer is formed on at least a portion of the surface of the above ceramic carbon composite material according to the present invention.

Examples of the ceramic coating layer include those formed of at least one selected from the group consisting of AlN, $Al_2O_3$, MgO, SiC, $Si_3N_4$, $B_4C$, TaC, NbC, ZrC, ZnO, $SiO_2$, and $ZrO_2$.

When the ceramic material forming the interfacial layer of the ceramic in the ceramic carbon composite material is different from the ceramic material forming the ceramic coating layer, the composition of the ceramic coating layer may change from the inner portion toward the outer portion. For example, the ceramic coating layer may have such a compositionally graded structure that the inner portion thereof close to the ceramic carbon composite material has a composition containing a large amount of ceramic material forming the interfacial layer of the ceramic and the content of ceramic material forming the interfacial layer of the ceramic gradually decreases toward the outer portion of the ceramic coating layer.

A method for producing a ceramic-coated ceramic carbon composite material according to the present invention is a method that can produce the above ceramic-coated ceramic carbon composite material according to the present invention, and the method includes the steps of: forming a yet-to-be-sintered green body for the ceramic carbon composite material; providing, on at least a portion of the surface of the green body, a layer of ceramic powder for forming the ceramic coating layer; and integrally sintering the green body for the ceramic carbon composite material on which the layer of ceramic powder is formed.

In the production method according to the present invention, the ceramic coating layer is formed of a layer of ceramic powder. The layer of ceramic powder forming the ceramic coating layer may be of a layered structure in which a plurality of layers are stacked. In the formation of such a layered structure, the layers can be stacked to have different compositions so that the ceramic layer gradually changes the composition from the inner portion toward the outer portion.

Furthermore, powder of the ceramic material forming the interfacial layer of the ceramic in the ceramic carbon composite material may be mixed into ceramic powder forming the ceramic coating layer. In other words, a mixture of powder of the ceramic material forming the interfacial layer of the ceramic and another ceramic material may be used as ceramic powder forming the ceramic coating layer.

A method for producing the ceramic-coated ceramic carbon composite material according to another aspect of the present invention includes the steps of: producing a sintered body of the ceramic carbon composite material; and placing a sintered ceramic sheet or a ceramic single crystal sheet on at least a portion of the surface of the sintered body of the ceramic carbon composite material and joining together to form the ceramic coating layer.

In this production method, the ceramic coating layer is formed using a sintered ceramic sheet or a ceramic single crystal sheet. By joining such a sintered ceramic sheet or a ceramic single crystal sheet to a sintered body of the ceramic carbon composite material, the ceramic coating layer is formed on the surface of the ceramic carbon composite material.

Advantageous Effects of Invention

The present invention can achieve a ceramic carbon composite material and a ceramic-coated ceramic carbon composite material which are lighter than ceramics and excellent in at least one of properties including oxidation resistance, resistance to dust generation, heat conductivity, electrical conductivity, strength, and denseness.

With the production method according to the present invention, the above ceramic carbon composite material or the above ceramic-coated ceramic carbon composite material according to the present invention can be efficiently produced.

DESCRIPTION OF EMBODIMENTS

Hereinafter, the present invention will be described with reference to specific embodiments; however, the present invention is not limited by the following embodiments.

Figure 1:
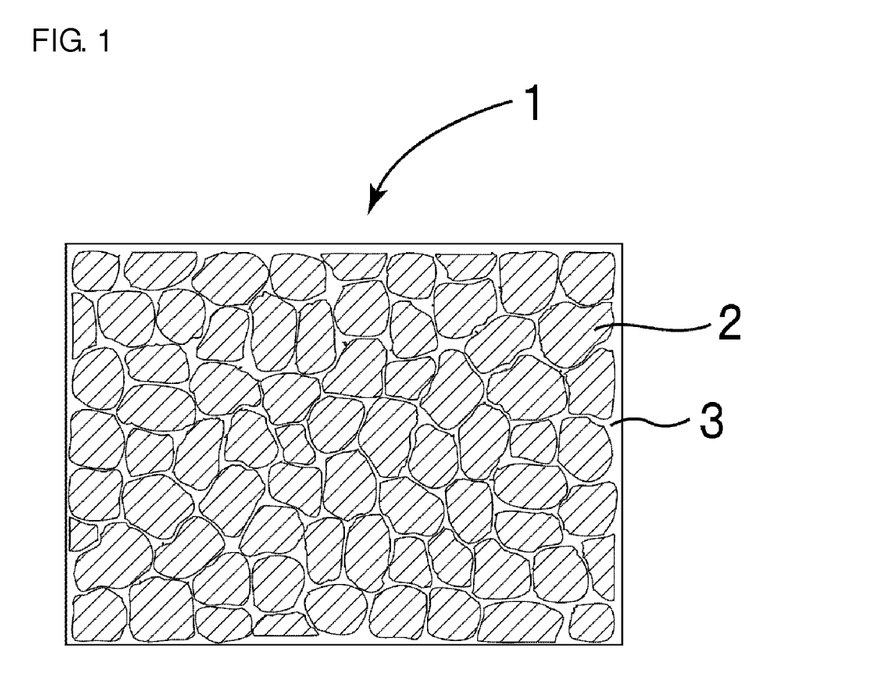
FIG. 1 is a schematic cross-sectional view showing a ceramic carbon composite material in an embodiment according to the present invention.

FIG. 1 is a schematic cross-sectional view showing a ceramic carbon composite material in an embodiment according to the present invention.

As shown in FIG. 1, the ceramic carbon composite material 1 is formed by disposing a ceramic interfacial layer 3 between carbon particles 2 of or containing graphite. The ceramic interfacial layer 3 forms a continuous three-dimensional network between the carbon particles 2. The ceramic material forming the ceramic interfacial layer 3 is excellent in oxidation resistance, heat resistance, wear resistance, strength, and other properties. Therefore, the ceramic interfacial layer 3 forming a continuous three-dimensional network can improve these properties in the ceramic carbon composite material 1.

Furthermore, when control is exercised over the type, shape, and size of the carbon particles 2, the type of the ceramic material forming the ceramic interfacial layer 3, and the thickness and the three-dimensional continuity of the ceramic interfacial layer, the oxidation resistance, wear resistance, strength, bulk density, and others of the ceramic carbon composite material 1 can be enhanced and the electrical conductivity, heat conductivity, and other properties thereof can be controlled to higher or lower values than desired.

When a ceramic material having electrical insulation, such as AlN, $Al_2O_3$, $Si_3N_4$, $SiO_2$, or $ZrO_2$, is used as a ceramic material forming the ceramic interfacial layer 3 to form a continuous three-dimensional network fully coating the carbon particles 2 with the ceramic interfacial layer 3, the ceramic carbon composite material 1 can be made into an electrical insulator. Furthermore, when SiC or ZnO is used as a ceramic material forming the ceramic interfacial layer 3 and the thickness of the ceramic interfacial layer 3 is as thin as several hundreds of nanometers, the ceramic carbon composite material 1 can be given a varistor effect so that upon application of a voltage exceeding a certain level, it generates a tunnel current or a Schottky current in the ceramic interfacial layer 3 to exhibit a nonlinear current-voltage characteristic.

The ceramic carbon composite material 1 shown in FIG. 1 can be produced by forming a green body made of ceramic-coated powder having carbon particles 2 coated with individual ceramic layers made of the ceramic material for forming the ceramic interfacial layer 3 and then sintering the green body.

Figure 2:
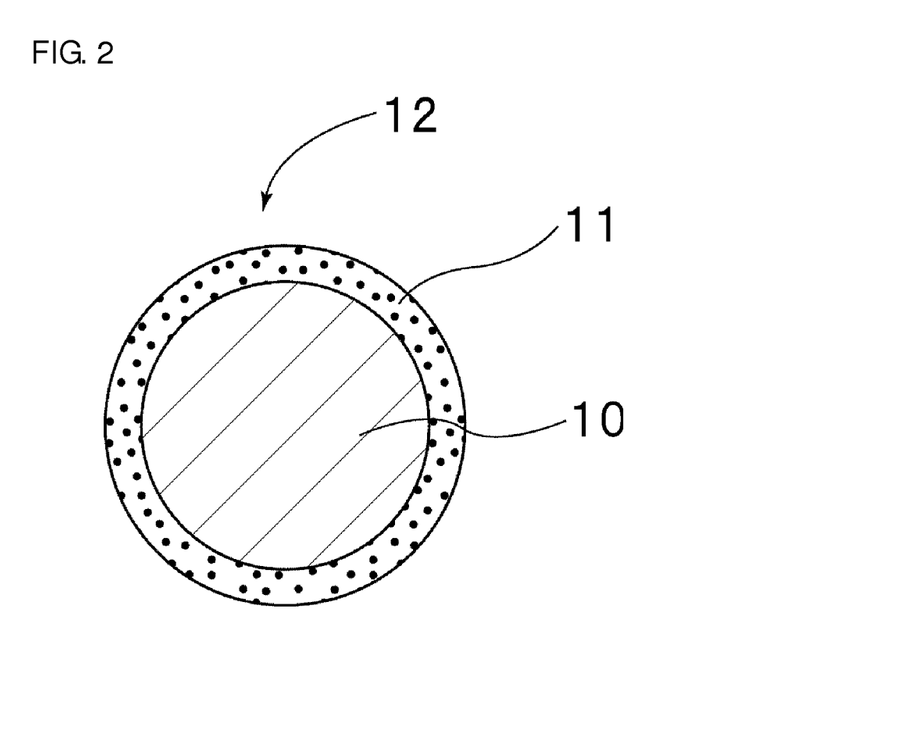
FIG. 2 is a schematic cross-sectional view showing a ceramic-coated powder particle in an embodiment according to the present invention.

FIG. 2 is a schematic cross-sectional view showing a ceramic-coated powder particle 12. As shown in FIG. 2, the particle is formed by coating the surface of a carbon particle 10 of or containing graphite with a ceramic layer 11 made of a ceramic.

No particular limitation is placed on the type of the carbon particles 10 so long as they are made of or contain graphite, but examples thereof that can be used include artificial graphite, natural graphite, mesophase, and glasslike carbon. The shape of these particles is preferably spherical but may be platy or prismoidal. No particular limitation is placed on the size of the carbon particles 10, but examples include those having an average particle diameter of 1 to 30 μm.

Examples of the ceramic material forming the ceramic layer 11 include oxides, carbides, and nitrides as listed previously. The thickness of the ceramic layer 11 can be selected variously in consideration of the thickness of the ceramic interfacial layer in the ceramic carbon composite material to be formed by sintering the ceramic-coated powder particles 12.

Furthermore, the ceramic layer 11 may be formed by stacking a plurality of layers. For example, the ceramic layer 11 maybe formed by stacking different types of ceramics in order to ensure the thermal stress of the carbon particles 10, the bondability with the carbon particles 10, and electrical insulation and control other functions.

Examples of a method for forming the ceramic layers 11 on the surfaces of the carbon particles 10 include, as described previously, gas phase methods, liquid phase methods, mechanically mixing methods, and combined methods thereof.

Examples of the gas phase methods include a chemical vapor deposition (CVD) method for depositing a ceramic by a vapor phase reaction and a conversion (CVR) method for forming a ceramic material by using carbon on the surfaces of the carbon particles 10 as a reaction source to react it with another component.

For example, when ceramic coatings are formed on the surfaces of carbon particles by a gas phase method, a layer of carbon particles is placed on a supply source for a reaction gas and they are heated in vacuum or an atmosphere of inert gas, such as Ar gas. Thus, ceramic layers can be formed on the surfaces of the carbon particles by a CVD or CVR method, with a thickness, for example, in the range of 100 nm to 10 μm.

An example of the liquid phase methods is a method in which carbon particles are added and mixed into a solution of a ceramic precursor material (for example, $Al(OH)_3$), dried to allow the precursor material to adhere to the surfaces of the carbon particles, and then subjected to heat treatment to convert the precursor material adhering to the particle surfaces into a ceramic material.

A specific example of formation of a ceramic on the surfaces of carbon particles through a liquid phase method is as follows.

Mesophase graphite powder (average particle diameter: 5 to 25 μm) is used as carbon particles. A small quantity of water is added to and mixed with the mesophase graphite powder, followed by dropwise addition of $NH_3H_2O$ to control the pH to about 11 and positively charging of the particle surfaces of the mesophase graphite powder. Next, a solution of $Al(NO_3)_3$ is added dropwise to the mixture with mixing to form a slurry. Added dropwise again to the mixture is $NH_3H_2O$ in a quantity sufficient to fully precipitate $Al(OH)_3$, followed by rinsing in water and washing in methanol. Thereafter, the resultant product is dried at 110° C. for half a day and the resultant powder is subjected to a heat treatment in an atmosphere of nitrogen at 1500° C. for two hours. Through this heat treatment, a carbothermal reduction reaction and a nitriding reaction occur, so that ceramic layers of AlN are formed on the individual particle surfaces of the mesophase graphite powder.

An example of the mechanical mixing methods is a method in which fine ceramic particles and carbon particles are mechanically mixed to coat the carbon particles with the fine ceramic particles. The size of the ceramic particles for coating is preferably smaller than that of the carbon particles and examples are average particle diameters of 200 nm to 1 μm. By allowing the fine ceramic particles to adhere to the surfaces of the carbon particles, ceramic layers can be formed on the individual surfaces of the carbon particles.

A specific example of the adhesion of ceramic layers to the surfaces of carbon particles through a mechanical mixing method is as follows.

For example, $Al_2O_3$ particles with an average particle diameter of 170 nm and mesophase graphite particles with an average particle diameter of 5 to 20 μm are mixed with addition of a small quantity of binder using a planetary centrifugal mixer to form mesophase graphite particles uniformly coated with alumina particles.

Alternatively, a slurry method may be used as a method for preparing ceramic-coated powder. The slurry method is a method in which ceramic layers are formed by adding carbon particles into a slurry of ceramic particles to allow the ceramic particles to adhere to the surfaces of the carbon particles. To allow the ceramic particles to adhere to the carbon particles, a binder may be previously added into the slurry of ceramic particles.

A specific example of the slurry method is the method of adding carbon particles into a slurry containing AlN nanoparticles and a binder, mixing them, and drying the mixture.

The ceramic-coated powder can be formed by selecting an appropriate means from among the gas phase methods, the liquid phase methods, the mechanical mixing methods, and the slurry methods in consideration of the reactivity between the ceramic and carbon particles, the size and shape of the ceramic particles, the difference in thermal expansion coefficient between the ceramic and carbon particles, and others. Alternatively, a ceramic layer composed of different types of ceramic layers stacked one on another may be formed on the carbon particle in consideration of the reactivity between the ceramic layer and the carbon particle, the difference in thermal expansion coefficient between them, and others.

A ceramic carbon composite material can be produced by forming a green body from the ceramic-coated powder obtained in the above manner and sintering the green body. Examples of a method for sintering the green body that can be used include pressureless sintering, hot pressing, and spark plasma sintering. Of these methods, spark plasma sintering is convenient because it enables high-density sintering in a short period of time of 2 to 60 minutes. Furthermore, it is possible to mix a ceramic-compatible sintering aid selected as needed into the ceramic-coated powder in a proportion of 0.5% to 20% by weight relative to the total weight and sinter the mixture.

Figure 3:
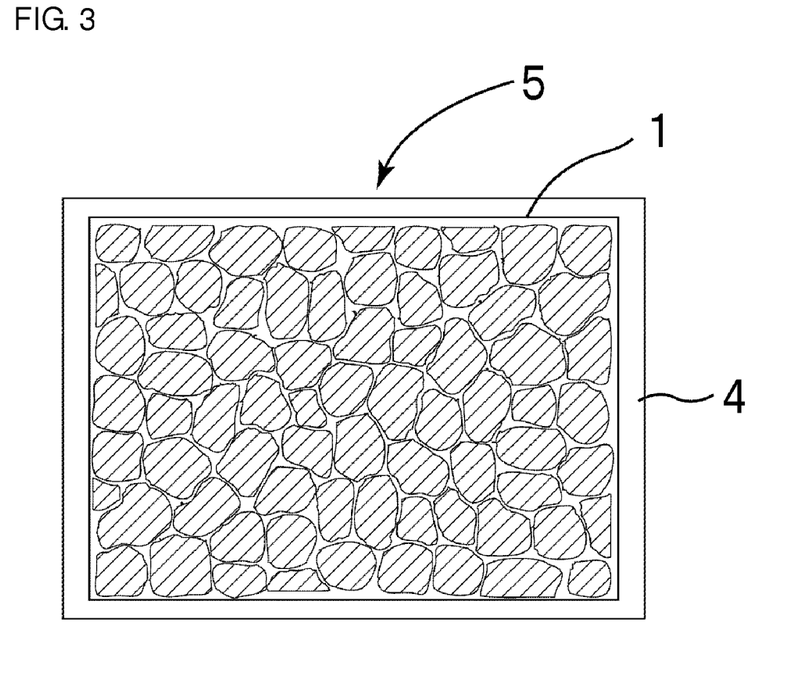
FIG. 3 is a schematic cross-sectional view showing a ceramic-coated ceramic carbon composite material in an embodiment according to the present invention.

FIG. 3 is a schematic cross-sectional view showing a ceramic-coated ceramic carbon composite material according to the present invention.

As shown in FIG. 3, the ceramic-coated ceramic carbon composite material of this embodiment is constituted by providing a ceramic coating layer 4 on the surface of the ceramic carbon composite material 1. Although in this embodiment the ceramic coating layer 4 is provided on the entire surface of the ceramic carbon composite material 1, the ceramic coating layer 4 in the present invention is not necessarily provided on the entire surface of the ceramic carbon composite material 1 and only has to be provided on at least a portion of the surface thereof. For example, the ceramic coating layer may be provided only on either one of the top, bottom, and side surfaces of the ceramic carbon composite material 1.

The ceramic coating layer 4 can be formed, as described previously, from ceramics including oxides, carbides, and nitrides. The ceramic material forming the ceramic coating layer 4 maybe the same as the ceramic material forming the ceramic interfacial layer 3 in the ceramic carbon composite material 1 or another type of ceramic material. If the composition of the ceramic coating layer 4 is different from that of the ceramic interfacial layer 3, the composition of the ceramic coating layer 4 may change from the inner portion toward the outer portion. In this case, it is also possible that the inner portion of the ceramic coating layer 4 has a composition close to the ceramic interfacial layer 3 and the rest thereof has gradually changing compositions from the inner portion toward the outer portion.

An example of a method for forming the ceramic coating layer 4 is the method of forming a yet-to-be-fired green body for a ceramic carbon composite material 1, providing, on at least a portion of the surface of the green body, a layer of ceramic powder for forming the ceramic coating layer 4, and in this state integrally sintering the ceramic carbon composite material 1 and the ceramic coating layer 4.

In this case, as described previously, the ceramic coating layer 4 may be formed of a plurality of layers and have different compositions in the direction of the thickness. Thus, the adhesion between the ceramic carbon composite material 1 and the ceramic coating layer 4 can be increased to improve properties, such as the strength as a whole.

Furthermore, the ceramic powder used to form the ceramic coating layer 4 may be a mixture of powder of the ceramic material forming the ceramic interfacial layer 3 and one or more other types of powder. Thus, the adhesion between the ceramic coating layer 4 and the ceramic interfacial layer 3 can be increased to improve properties, such as strength.

An alternative example of the method for forming the ceramic coating layer 4 is the method of producing a sintered body of the ceramic carbon composite material 1, placing a sintered ceramic sheet or a ceramic single crystal sheet on at least a portion of the surface of the sintered body, and joining the sintered ceramic sheet or single crystal sheet to the surface of the ceramic carbon composite material 1. Specific example of the method for joining include hot pressing, spark plasma sintering, and welding heating.

Alternatively, it is of course possible to use a sintered body of the ceramic carbon composite material as a substrate and coat the substrate with a ceramic by a normal CVD method or a reactive sputtering method.

EXAMPLES

Hereinafter, the present invention will be described in more detail with reference to specific examples; however, the present invention is not limited by the following examples.

Ceramic carbon composite materials and ceramic-coated ceramic carbon composite materials obtained by Examples and Comparative Examples described below were evaluated for their properties using the following evaluation methods.

[Evaluation of Sintering]

The sintered ceramic carbon composite materials and sintered ceramic-coated ceramic carbon composite materials were visually evaluated for cracks, and peeling and deformation on the ceramic surface.

Furthermore, the above composite materials were measured in terms of bulk density to calculate their porosities.

[Oxidation Resistance Test]

Small pieces of the sintered ceramic carbon composite materials and sintered ceramic-coated ceramic carbon composite materials were used and subjected to a thermogravimetric test to raise their temperatures at a rate of temperature rise of 10° C./min and measured in terms of weight reduction onset temperature. The measured temperatures were taken as oxidation onset temperatures.

[Strength Test]

The sintered ceramic carbon composite materials and sintered ceramic-coated ceramic carbon composite materials were each cut into a size of 4 mm by 2 mm by 20 mm and the cut pieces were measured in terms of bending strength by a three-point bending test. The span was 15 mm and the crosshead speed was 0.5 mm/min.

[Measurement of Heat Conductivity]

The ceramic carbon composite materials and ceramic-coated ceramic carbon composite materials were made into pieces of 10 mm diameter and 2 mm thickness and the pieces were measured in terms of heat conductivity by a laser flash method.

[Measurement of Electrical Resistivity]

The surface resistivities of the sintered ceramic carbon composite materials and sintered ceramic-coated ceramic carbon composite materials were measured by a direct current four-probe method.

[Evaluation of Resistance to Dust Generation]

The sintered ceramic carbon composite materials and sintered ceramic-coated ceramic carbon composite materials were rubbed against a sheet of white paper at a certain load, and the resultant coloring of the sheet of white paper was visually observed and evaluated based on the following criteria.

Circle: The white paper is not colored.
Triangle: The paper is slightly turned gray.
Cross: The paper is easily turned black to allow carbon to adhere thereto.

Example 1

Water (5% by volume) was added to mesophase graphite powder (10 g, particle diameter: 5 to 20 μm) with mixing to obtain a slurry. Added dropwise to the slurry was $NH_3H_2O$ to control the pH value to about 11, followed by addition and mixing of a solution of $Al(NO_3)_3$ (20% by weight) and further dropwise addition of $NH_3H_2O$ (28% by weight). The quantity of $NH_3H_2O$ was ten times larger than the assumed quantity thereof at which $Al(OH)_3$ would be fully precipitated. Thereafter, the slurry was rinsed in water, washed in methanol, and dried at 110° C. The resultant product was subjected to a carbothermal reduction and nitriding treatment at 1500° C. for two hours. Powder X-ray diffraction and SEM observation conducted on the resultant product revealed that almost all of $Al(OH)_3$ was converted into AlN and substantially uniformly coated the surfaces of the mesophase graphite particles. The amount of AlN coating obtained from the calibration curve of the X-ray diffraction was approximately 20% by volume. When the amount of coating was greater than the above value, the coating layer was often peeled or cracked. The above AlN-coated mesophase graphite powder was packed into a graphite mold and sintered at 1600° C. and 30 MPa for five minutes by spark plasma sintering. The resultant ceramic carbon composite material was evaluated for the properties in the above manner. The results of the evaluation tests are shown in Table 1.

Example 2

Figure 4:
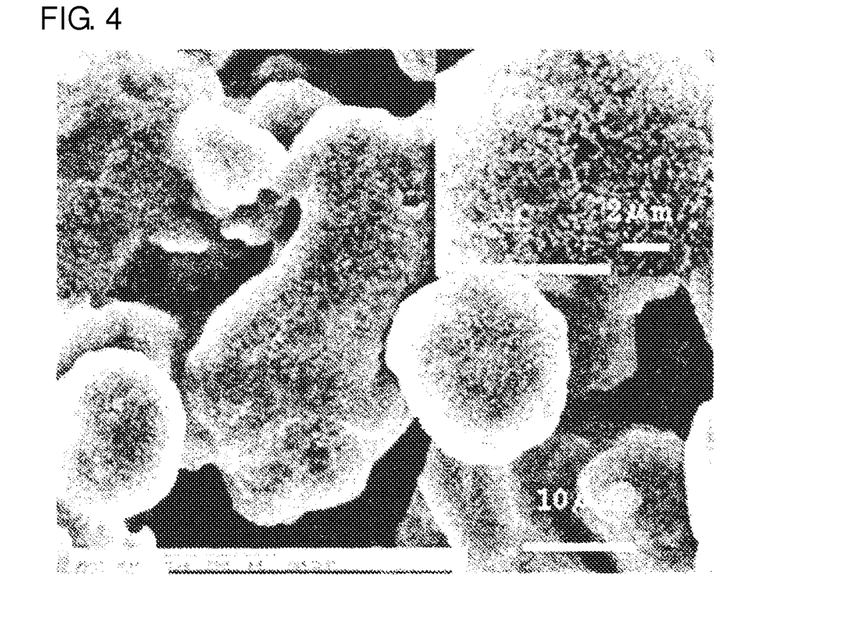
FIG. 4 is a scanning electron micrograph showing $Al_2O_3$-coated graphite particles in an example according to the present invention.
Figure 5:
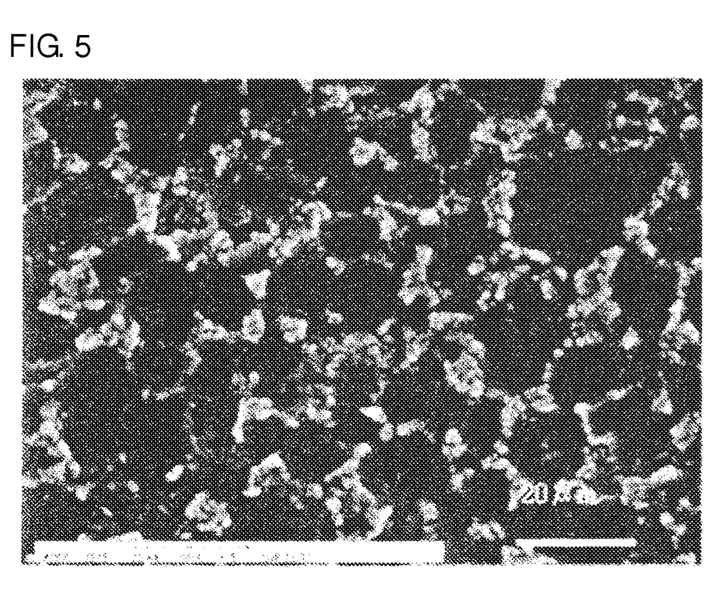
FIG. 5 is a scanning electron micrograph showing a cross section of a ceramic carbon composite material in the example according to the present invention.

Mesophase graphite powder (5 g) of the same material as in Example 1 and an aqueous solution of hydroxyethyl cellulose (5% by weight, 1.5 g) were put into a plastic container and mechanically mixed for 30 seconds by a planetary centrifugal mixer (model number: AR-310, manufactured by THINKY Corporation). Subsequently added to the mixture was $Al_2O_3$ powder (average particle diameter: 100 nm, grade: TM-D, manufactured by Taimei Chemicals Co., Ltd., 2.3 g) with mixing for two minutes, followed by drying. The $Al_2O_3$ particles were uniformly coated on the particle surfaces of the mesophase graphite powder as shown in FIG. 4. The amount of $Al_2O_3$ was approximately 20% by volume. The above $Al_2O_3$-coated powder was packed into a graphite mold and subjected to spark plasma sintering while being pressurized for 20 minutes under conditions at 2000° C. and 40 MPa. The test results are shown in Table 1. Furthermore, the texture of the sintered $Al_2O_3$ carbon composite material is shown in FIG. 5.

Example 3

Spherical natural graphite powder (25 g) was put into 6.23 g of binder solution in which acrylamide (8 g) and N,N'-methylenebisacrylamide (1 g) were dissolved in isopropanol (45 g), followed by centrifugal mixing for one minute. Subsequently added to the mixture was AlN powder (average particle diameter: 0.6 μm, grade: H, manufactured by Tokuyama Corporation, 9.35 g), followed by mixing for three minutes to prepare a slurry. Thereafter, the slurry was poured into a plastic mold and dried therein at 90° C. for 12 hours. The resultant green body was subjected to spark plasma sintering under the same conditions as in Example 1. The test results are shown in Table 1. The spherical natural graphite particles used were those having an average particle diameter of 20 μm.

Example 4

The $Al_2O_3$-coated mesophase graphite powder produced in Example 2 was packed into a graphite mold, AlN powder containing $Y_2O_3$ (5% by weight) added thereto as a sintering aid was laid on the $Al_2O_3$-coated mesophase graphite powder, and these materials were subjected to spark plasma sintering under the same conditions as in Example 2. A dense AlN layer (1 mm thick) could be coated on the composite material, in which neither crack nor peeling occurred. Furthermore, a sample entirely coated with an AlN layer was also produced and the sample had no cracks and the like.

Comparative Example 1

Spherical natural graphite powder (10 g) of the same material as used in Example 3 and fine SiC powder (SERA-A06 manufactured by Shinano Electric Refining Co., Ltd., average particle diameter: 600 nm, 12 g) were mixed well by a mil, and the mixture was packed into a graphite mold and sintered by spark plasma sintering under the same conditions as in Example 1. The results of the evaluation tests are shown in Table 1.

Comparative Example 2

Spherical natural graphite powder of the same material as used in Example 3 was packed, without being coated with ceramic particles, into a graphite mold and sintered by spark plasma sintering under the same conditions as in Example 1. The results of the evaluation tests are shown in Table 1.

Comparative Example 3

Spherical natural graphite powder (10 g) of the same material as used in Example 3 and AlN powder (manufactured by Tokuyama Corporation, average particle diameter: 0.6 μm, 3.74 g) were mixed by an ordinary tumbling mil for half a day, and the mixture was then packed into a graphite mold and subjected to spark plasma sintering under the same conditions as in Example 1. The test results are shown in Table 1.

Comparative Example 4

Mesophase graphite powder of the same material as used in Example 1 was packed, without being coated with ceramic particles, into a graphite mold and sintered by spark plasma sintering under the same conditions as in Example 1. The graphite powder could not be sintered and therefore not consolidated.

TABLE 1

|  | Examples | | | | Comparative Examples | | |
| --- | --- | --- | --- | --- | --- | --- | --- |
|  | 1 | 2 | 3 | 4 | 1 | 2 | 3 |
| Cracks and Deformation | Not found | Not found | Not found | Not found | Not found | Cracks | Not found |
| Resistance to Heat and Dust | Δ | Δ | Δ | ○ | x | x | x |
| Bulk Density (Mg/m$^3$) | 2.00 | 2.20 | 2.29 | 2.40 | 2 | 1.5 | 1.93 |
| Porosity(%) | 15 | 13 | 4 | 4 | 15 | 31 | 20 |
| Oxidation Onset Temperature (° C.) | 530 | 560 | 620 | Not measured | 500 | 450 | 520 |
| Bending Strength (MPa) | 45 | 36 | 43 | 107 | 50 | — | 28 |
| Heat Conductivity (W/mK) | 30 | 50 | 150 | 50 | 30 | — | 14 |
| Electrical Resistivity (μΩm) | 65 | 44 | 36 | Insulated | 55 | — | 145 |

As is evident from the results shown in Table 1, it can be seen that the ceramic carbon composite materials of Examples 1 to 3 according to the present invention and the ceramic-coated ceramic carbon composite material of Example 4 according to the present invention are lighter than ceramics and excellent in oxidation resistance, resistance to dust generation, heat conductivity, electrical conductivity, strength, and denseness. Note that in Table 1 the oxidation onset temperature of the ceramic-coated ceramic carbon composite material of Example is described as "Not measured", which means that since the composite material is coated with a ceramic coating layer, oxidation hardly progresses in the measured temperature range.

REFERENCE SIGNS LIST

1 . . . Ceramic carbon composite material
2 . . . Carbon particle
3 . . . Ceramic interfacial layer
4 . . . Ceramic coating layer
5 . . . Ceramic-coated ceramic carbon composite material
10 . . . Carbon particle
11 . . . Ceramic layer
12 . . . Ceramic-coated powder

The invention claimed is:

1. A ceramic carbon composite material in which an interfacial layer of a ceramic is formed between carbon particles of or containing graphite; wherein
the interfacial layer of the ceramic has a continuous three-dimensional network between the carbon particles of or containing graphite.

2. The ceramic carbon composite material according to claim 1, wherein the interfacial layer of the ceramic is formed of at least one selected from the group consisting of AlN, Al$_2$O$_3$, SiC, Si$_3$N$_4$, B$_4$C, TaC, NbC, ZrC, ZnO, SiO$_2$, and ZrO$_2$.

3. The ceramic carbon composite material according to claim 1, wherein the thickness of the interfacial layer of the ceramic is 100 nm to 10 μm.

4. A ceramic-coated ceramic carbon composite material in which a ceramic coating layer is formed on at least a portion of the surface of the ceramic carbon composite material according to claim 1.

5. The ceramic-coated ceramic carbon composite material according to claim 4, wherein the ceramic coating layer is formed of at least one selected from the group consisting of AlN, Al$_2$O$_3$, MgO, SiC, Si$_3$N$_4$, B$_4$C, TaC, NbC, ZrC, ZnO, SiO$_2$, and ZrO$_2$.

6. The ceramic-coated ceramic carbon composite material according to claim 4, wherein when the ceramic material forming the interfacial layer of the ceramic in the ceramic carbon composite material is different from the ceramic material forming the ceramic coating layer, the composition of the ceramic coating layer changes from the inner portion toward the outer portion.

7. A method for producing the ceramic carbon composite material according to claim 1, the method comprising the steps of:
preparing ceramic-coated powder in which the surfaces of carbon particles of or containing graphite are coated with individual ceramic layers made of the ceramic; and
forming a green body from the ceramic-coated powder and sintering the green body to produce the ceramic carbon composite material.

8. The method for producing the ceramic carbon composite material according to claim 7, wherein the ceramic layers are formed on the surfaces of the carbon particles by a gas phase method, a liquid phase method, a mechanically mixing method, or a combined method thereof.

9. The method for producing the ceramic carbon composite material according to claim 7, wherein the ceramic layers are formed by adding the carbon particles into a slurry of ceramic particles to allow the ceramic particles to adhere to the surfaces of the carbon particles.

10. A method for producing the ceramic-coated ceramic carbon composite material according to claim 4, the method comprising the steps of:
forming a yet-to-be-sintered green body for the ceramic carbon composite material;
providing, on at least a portion of the surface of the green body, a layer of ceramic powder for forming the ceramic coating layer; and
integrally sintering the green body for the ceramic carbon composite material on which the layer of ceramic powder is formed.

11. A method for producing the ceramic-coated ceramic carbon composite material according to claim 4, the method comprising the steps of:
producing a sintered body of the ceramic carbon composite material; and
placing a sintered ceramic sheet or a ceramic single crystal sheet on at least a portion of the surface of the sintered body of the ceramic carbon composite material and joining together to form the ceramic coating layer.

* * * * *